United States Patent [19]

Ebert et al.

[11] Patent Number: 4,973,652

[45] Date of Patent: Nov. 27, 1990

[54] PROCESS FOR THE PRODUCTION OF AROMATIC POLYCARBONATES, AROMATIC POLYESTER CARBONATES AND AROMATIC POLYESTERS WITH P CONTAINING CATALYST AND MIXTURE OF HYDROCARBONS

[75] Inventors: Wolfgang Ebert; Rolf-Volker Meyer; Rolf Dhein; Udo Oels, all of Krefeld, Fed. Rep. of Germany

[73] Assignee: Bayer Aktiengesellschaft, Leverkusen, Fed. Rep. of Germany

[21] Appl. No.: 361,876

[22] Filed: Jun. 6, 1989

[30] Foreign Application Priority Data

Jun. 11, 1988 [DE] Fed. Rep. of Germany ....... 3819943

[51] Int. Cl.$^5$ ..................... C08G 63/81; C08G 64/20; C08G 63/82
[52] U.S. Cl. ................................. 528/198; 528/176; 528/179; 528/196; 528/274
[58] Field of Search ............... 528/198, 196, 179, 176, 528/274

[56] References Cited

U.S. PATENT DOCUMENTS

| | | | |
|---|---|---|---|
| 3,028,365 | 4/1962 | Schnell et al. | 260/47 |
| 3,112,292 | 11/1963 | Bottenbruch et al. | 260/47 |
| 3,275,601 | 9/1966 | Schnell et al. | 260/47 |
| 3,530,094 | 9/1970 | Bottenbruch et al. | 260/47 |
| 4,038,252 | 7/1977 | Vernaleken et al. | 260/47 |
| 4,334,053 | 6/1982 | Freitag et al. | 528/179 |
| 4,631,338 | 12/1986 | Meyer et al. | 528/483 |

FOREIGN PATENT DOCUMENTS

| | | |
|---|---|---|
| 1173998 | 9/1984 | Canada . |
| 2147266 | 5/1966 | Japan . |

*Primary Examiner*—Harold D. Anderson
*Attorney, Agent, or Firm*—Joseph C. Gil; Aron Preis

[57] ABSTRACT

The invention relates to a process for the production of aromatic polycarbonates, aromatic polyester carbonates and aromatic polyesters by the known two-phase interfacial method which is characterized in that a mixture of aromatic hydrocarbons with alkanes and/or cycloalkanes is used as the organic phase and in that phosphines or phosphine oxides are used as the catalysts.

3 Claims, No Drawings

PROCESS FOR THE PRODUCTION OF AROMATIC POLYCARBONATES, AROMATIC POLYESTER CARBONATES AND AROMATIC POLYESTERS WITH P CONTAINING CATALYST AND MIXTURE OF HYDROCARBONS

This invention relates to a process for the production of aromatic polycarbonates, aromatic polyester carbonates and aromatic polyesters by the known two-phase interfacial method in the presence of aqueous and organic phase by reaction of diphenols with phosgene and/or with aromatic dicarboxylic acid dihalides in the presence of catalysts, optionally using monofunctional chain terminators and optionally using trifunctional or more than trifunctional branching agents, optionally in the presence of reducing agents, characterized in that a mixture of from 5 to 95% by weight, preferably from 30 to 90% by weight and more preferably from 50 to 85% by weight of aromatic hydrocarbons with from 95 to 5% by weight, preferably from 70 to 10% by weight and more preferably from 50 to 15% by weight alkanes and/or cycloalkanes is used as the organic phase and in that phosphines or phosphine oxides are used as the catalysts.

The production of thermoplastic polycarbonates by the two-phase interfacial method is known (see for example U.S. Pat. Nos. 3,028,365 and 3,275,601). The organic phase used may be gasoline, ligroin, cyclohexane, methyl cyclohexane, benzene, toluene, xylenes, etc. (see for example U.S. Pat. No. U.S. Pat. No. 3,028,365, column 2, lines 45 to 48 in conjunction with lines 32 to 35 of column 2 and the Examples).

The mixtures of aromatic hydrocarbons with alkanes or cycloalkanes used in accordance with the invention are not described therein.

Although, according to U.S. Pat. No. 3,112,292, which relates to the production of linear, crystallized polycarbonates, production by the interfacial method may be carried out in the presence of aromatic hydrocarbons, such as benzene, toluene, xylene (column 2, line 46), aliphatic hydrocarbons and cycloaliphatic hydrocarbons may be used to promote the crystallization of the polycarbonate from its solutions (column 3, lines 18 to 24).

According to Japanese patent publication no. 21 472/66, it is possible directly to prepare the polycarbonate in solid form by carrying out the reaction with phosgene in the presence of optionally chlorinated aromatic hydrocarbons, surfactants and aqueous alkali solution.

According to U.S. Pat. No. 3,530,094, aromatic, aliphatic and cycloaliphatic hydrocarbons may be used to precipitate polycarbonate from its solutions (column 6, lines 60 et seq.), while benzene and toluene may also form the organic phase in the production of polycarbonate by the interfacial method (column 5, lines 28 to 33).

According to DE-OS 2 410 716 (Le A 15 514), chlorobenzene is recommended as solvent for the production of polycarbonates, although temperatures above 70° C. have to be maintained.

Finally, it is known from DE-OS 3 429 960 (Le A 22 921) that polycarbonate solutions may be treated with vapors of benzene or alkylbenzenes, enabling the polycarbonates to be carefully isolated. It follows from this that benzene or alkylbenzenes have proved to be unsuitable in practice, even as the organic phase, in interfacial polycondensation reactions.

DE-OS 2 940 024 (Le A 19 932) describes the interfacial process for the production of aromatic polyesters. The solvents used include dichloromethane, chloroform, triand tetrachloroethylene, tetrachloroethanes, chlorobenzenes, dichlorobenzenes and mixtures of these compounds (page 11, lines 6 to 12 of the DE-OS).

DE-OS 3 007 934 (Le A 20 203) describes the two-phase interfacial process for the production of aromatic polyester carbonates. The solvents used are again the chlorine-containing solvents mentioned above (page 11, last paragraph of the DE-OS)

Accordingly, it can be seen that, in practice, the interfacial process is generally carried out using chlorine-containing compounds as solvent, although this involves certain disadvantages so far as the isolation of the thermoplastic polycarbonates at least is concerned, so that special, i.e. elaborate, measures are required for this purpose (see for example DE-OS 34 29 960).

On the other hand, the process according to the invention for the production of aromatic polyesters and polyester carbonates affords the advantage of being able to work in unusually high concentrations, so that a better volume/time yield can be obtained. The problem of completely removing the halogenated hydrocarbons is not of primary concern in this regard.

The aromatic hydrocarbons to be used in accordance with the invention preferably contain from 7 to 15 C atoms and correspond in particular to formula (I)

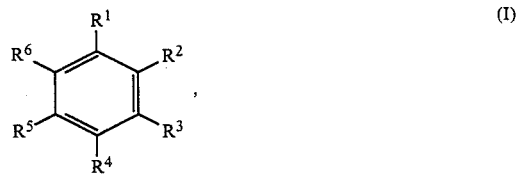

in which $R^1$ to $R^6$ independently of one another represent hydrogen or optionally branched $C_1$–$C_{19}$ alkyl, phenyl or $C_7$–$C_9$ alkaryl/aralkyl; with the proviso that always at least one of the substituents $R^1$ to $R^6$ is not hydrogen; in addition, two substituents $R^1$ to $R^6$ in the ortho-position may form an optionally substituted, aromatic or cycloaliphatic fused ring.

Examples of aromatic hydrocarbons are toluene, ethylbenzene, 1,2-dimethylbenzene, 1,3-dimethylbenzene, 1,4-dimethylbenzene, 2-, 3- and 4-ethyl toluene, cumene, n-propylbenzene, 1,2,3-trimethylbenzene, 1,2,4-trimethylbenzene, 1,3,5-trimethylbenzene, i/n-/sec./tert.-butylbenzene, o/m/p-cymol, 1,2-, 1,3- and 1,4-diethylbenzene, 2-/3-/4-methyl-n/i-propylbenzene, 1,2,3,4-tetramethylbenzene, 1,2,3,5-tetramethylbenzene, 1,2,4,-tetramethylbenzene, n-amylbenzene, isoamylbenzene, pentamethylbenzene, 1-/2-methyl naphthalene, 1-/2-ethyl naphthalene, 1,2-/1,4-/1,6-/1,7-dimethylnaphthalene, hexamethylbenzene, hexylbenzene, 1,3,5-triethylbenzene, 1,2,5-trimethyl naphthalene, 1,2,7-trimethyl naphthalene and 1,3,5 triisopropylbenzene, tetralin, ditolyl, diphenyl. Particularly preferred aromatic hydrocarbons are toluene, ethylbenzene, o/m/p-xylene, 1,3,5-trimethylbenzene, 1,3,5-triisopropylbenzene.

The optionally branched alkanes used in accordance with the invention contain from 5 to 20 C atoms and preferably from 5 to 12 C atoms.

Examples of alkanes are n/i-pentane, n/i-hexane, n/i-heptane, n/i-octane and the mixtures thereof which are also obtained, for example, in the distillation of petroleum fractions.

The cycloalkanes used in accordance with the invention contain from 5 to 20 C atoms and preferably from 5 to 12 C atoms.

Examples of cycloalkanes are cyclopentane, cyclohexane, ethyl cyclopentane, methyl cyclohexane, ethyl cyclohexane, tetralin and decalin, cyclooctane, cyclododecane.

Combinations of the aromatic hydrocarbons mentioned with the alkanes mentioned and/or with the cycloalkanes may be used. Suitable combinations are, for example, toluene/ pentane, toluene/hexane, toluene/heptane, toluene/i/n-octane, toluene/cyclopentane, toluene/cyclohexane, toluene/petroleum ether, toluene/gasoline, xylene/pentane, xylene/ hexane, xylene/heptane, xylene/i/n-octane, xylene/cyclopentane, xylene/cyclohexane, xylene/petroleum ether, xylene/gasoline, mesitylene/pentane, mesitylene/hexane and mesitylene/i/n-octane. Preferred combinations are, for example, toluene/pentane, toluene/i-octane, toluene/petroleum ether, toluene/gasoline, toluene/cyclohexane, xylene/i-octane, xylene/petroleum ether, xylene/gasoline and xylene/cyclohexane.

The quantity of organic phase used to carry out the process according to the invention is from 300 ml to 8000 ml per mol diphenol and preferably from 350 ml to 5000 ml per mol diphenol.

The reaction temperatures for the interfacial process are in the range from 0° C. to 100° C. and more especially in the range from 5° C. to 50° C., the boiling point of the reaction mixture naturally having to be taken into consideration and the reaction optionally having to be carried out under a slight excess pressure.

The reaction times for the interfacial process, including the post-condensation time, are between 15 minutes and 150 minutes.

The reaction according to the invention takes place under pressures of 1 atm to 6 atms and preferably at normal pressure.

The pH value of the aqueous phase of the two-phase interfacial process according to the invention is in the range from 9 to 14 and preferably in the range from 10 to 14. The quantity of aqueous phase has to be gauged in such a way that emulsions are obtained under the stirring conditions selected.

Suitable basic materials for the aqueous phase are the usual basic materials, such as for example aqueous alkali or aqueous alkaline earth, preferably aqueous alkali and, more particularly, aqueous NaOH or aqueous KOH.

The diphenols to be used in the process according to the invention are any of those which do not contain any reactive substituents under the reaction conditions of the interfacial process according to the invention, i.e. apart from the two phenolic OH groups, at most only substituents which are inert under the reaction conditions of the interfacial process according to the invention, such as for example aromatically bound chlorine, bromine or alkyl.

The diphenols preferably contain from 6 to 21 C atoms.

Examples of diphenols are dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropylbenzenes, 4,4'-dihydroxydiphenyl, 4,4'-dihydroxy-3,3,,5,5,-tetramethyl diphenyl, 4,4'-dihydroxy-3,3',5,5'-tetrachlorodiphenyl, bis-(4-hydroxyphenyl)-methane, bis-(4-hydroxy-3,5-dimethylphenyl)-methane, bis-(4-hydroxy-3,5-dichlorophenyl)-methane, 2,2-bis-(4-hydroxyphenyl)-propane,2,2-bis-(4-hydroxy-3,5-dimethylphenyl)-propane, 2,2-bis-(4-hydroxy-3,5-dichlorophenyl)-propane, 1,1-bis-(4-hydroxyphenyl)cyclohexane, 1,1-bis-(4-hydroxy-3,5-dimethylphenyl)-cyclohexane,1, 1-bis-(4-hydroxy-3,5-dichlorophenyl)-cyclohexane, bis-(4-hydroxyphenyl)-sulfone,bis-(4-hydroxy-3,5-dichlorophenyl)-sulfone, bis-(4-hydroxy-3,5-dimethylphenyl)-sulfone, bis-(4-hydroxyphenyl)-sulfide, bis-(4-hydroxy-3,5-dimethylphenyl)-sulfide, bis-(4-hydroxy-3,5-dichlorophenyl)-sulfide, bis-(4-hydroxyphenyl)-oxide, bis-(4-hydroxy-3,5-dimethylphenyl)-oxide, bis-(4-hydroxyphenyl)-ketone and bis-(4-hydroxy-3,5-dimethylphenyl)-ketone.

These diphenols are either known from the literature or may be obtained by methods known from the literature.

Preferred diphenols are 2,2-bis-(4-hydroxyphenyl)-propane, 1,1-bis-(4-hydroxyphenyl)-cyclohexane, bis-(4-hydroxyphenyl)-sulfide, bis-(4-hydroxyphenyl)-sulfone and 2,2-bis-(4-hydroxy-3,5-dimethylphenyl)-propane.

The diphenols may be used both individually and also in the form of a mixture of two or more diphenols.

Aromatic dicarboxylic acid dichlorides suitable for use in accordance with the invention are preferably those containing from 8 to 18 C atoms, more especially those corresponding to formula (IV)

$$ClC-Ar-C-Cl \quad \text{(IV)}$$
$$\underset{O}{\|} \quad \underset{O}{\|}$$

in which

Ar is an aromatic, optionally substituted radical containing from 6 to 14 C atoms.

Suitable aromatic dicarboxylic acid dihalides are, of example, terephthalic acid dichloride, isophthalic dichloride, phthalic acid dichloride and naphthalene-1,2-, -1,4-, -1,5- or -1,8-dicarboxylic acid dichloride.

Terephthalic acid dichloride and isophthalic acid dichloride and mixtures thereof are preferred.

Chain terminators suitable for use in accordance with the invention are monophenols and chlorides of monobasic acids, particularly monocarboxylic acids.

Suitable monophenols are phenol, p-tert.-butylphenol. o-cresol, m-cresol, p-cresol, 2-/3-/4-ethylphenol, cumene,

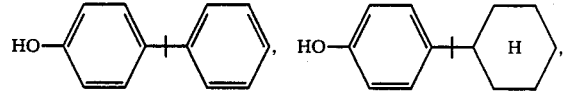

p-nonylphenol, p-isooctylphenol, p-chlorophenol, p-bromophenol, β-naphthol, α-naphthol.

Suitable acid chlorides are, for example, acetyl chloride, benzoyl chloride, naphthoic acid chloride or the chloroformates of the phenols mentioned above.

The chain terminators are used in quantities of from 0.2 to 10.0 mol-% and preferably in quantities of from 1.0 to 6.5 mol-%, based on the mols diphenol used.

It is possible to use both the monophenols alone and also the acid chlorides alone, although the monophenols and acid chlorides may be added together, but in that case gradually.

Branching agents suitable for the process according to the invention are, for example, polyhydroxy compounds containing three or more than three phenolic hydroxy groups.

Suitable branching components are the compounds described in DE-OS 1 570 533, 15 95 762, 21 16 974, 21 13 347 and 25 090 924, in GB-PS No. 1,079,821 and in U.S. Pat. No. 3,544,514.

Some of the compounds containing three or more than three phenolic hydroxy groups which may be used are, for example, phloroglucino1,4,6-dimethyl-2,4,6-tri-(4-hydroxyphenyl)-hept-2-ene, 4,6-dimethyl-2,4,6-tri-(4hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane and 1,4-bis-(4,4''-dihydroxytriphenylmethyl)-benzene. Some of the other trifunctional compounds are trimesic acid trichloride, cyanuricchloride,3,3-bis-(4-hydroxyphenyl)-2-oxo-2,3-dihydroindole and 3,3-bis-(4-hydroxy-3-methylphenyl)-2-oxo-2, 3-dihydroindole.

The quantity in which the branching agent is used is from 0.05 to 3.0 mol-% and preferably from 0.1 to 1.5 mol-%, based on the diphenols used.

The quantity of phosphines and/or phospine oxides to be used in accordance with the invention as catalysts varies from 0.2 to 10 mol-%, depending on the type of diphenols used, and where optionally tetrasubstituted diphenols are used, it is between 0.5 and 15 mol %, based in each case on the total quantity of diphenols used.

The catalysts may be used either individually or in the form of mixtures of different catalysts.

Phosphines suitable for the process according to the invention are those corresponding to formula (V)

in which

Z is a $C_6$–$C_{14}$ aryl radical, which may be substituted or unsubstituted, a $C_7$–$C_{15}$ alkaryl radical, which may be substituted or unsubstituted, a $C_7$–$C_{15}$ aralkyl radical, which may be substituted or unsubstituted, and $Z^1$ has the same meaning as Z and, in addition, may be a $C_1$–$C_{18}$ alkyl radical which may be substituted or unsubstituted.

Suitable phosphines are, for example, triphenyl phosphine, diphenyl butyl phosphine, diphenyl octadecyl phosphine, diphenyl benzyl phosphine, tris-p-tolyl phosphine, tris-(p-chlorophenyl)-phosphine and phenyl naphthyl benzyl phosphine.

Phosphine oxides suitable for the process according to the invention are those corresponding to formula (VI)

in which Z and $Z^1$ have the same meaning as for formula (V).

Suitable phosphine oxides are, for example, triphenyl phosphine oxide, butyl diphenyl phosphine oxide, octadecyl diphenyl phosphine oxide, benzyl diphenyl phosphine oxide, tris-p-tolyl phosphine oxide, tris-(p-chlorophenyl)-phosphine oxide and phenyl naphthyl benzyl phosphine oxide.

The catalysts are added in known manner either before or during or after the phosgenation or addition of the acid chloride.

Suitable reducing agents are, for example, sodium sulfite or sodium borohydride. The reducing agents are used in quantities of from 0.25 to 2 mol-%, based on mols diphenols.

Instead of phosgene, COBrz and also bishaloformates of the diphenols, for example the bischloroformates of 2,-bis-(4-hydroxyphenyl)-propane or of 2,2-bis-(4-hydroxy-3,5-dimethylphenyl)-propane , and also for example the bischloroformates of the bisdiphenyl esters of aromatic dicarboxylic acids, may also be used in the process according to the invention.

It is also possible to use bishaloformates of aromatic oligocarbonates and bis-acid-bishalides of aromatic oligoesters of aromatic dicarboxylic acids and diphenols.

The quantity of phosgene, based on phenolic OH, required for carrying out the process according to the invention may be between 100 and 200 mol-%, but is preferably between 110 and 150 mol-%, in the synthesis of aromatic polycarbonates.

The same applies where bishaloformates are used.

The quantity of dicarboxylic acid dihalide, based on phenolic OH, required for carrying out the process according to the invention may be between 98 and 103 mol-%, but is preferably between 99 and 102 mol-%, in the synthesis of aromatic polyesters.

The same applies where bis-acid-bishalides of aromatic oligoesters are used.

The ratio of carbonate to dicarboxylic acid diester structures in the production of aromatic polyester carbonates in accordance with the invention may be from 1:25 to 25:1 and is preferably from 1:20 to 10:1 (carbonate:dicarboxylic acid diester).

The reaction of the dicarboxylic acid dichlorides is preferably carried out before the phosgenation and the phosgene is used in excesses of 10 to 50 mol-% over and above the stoichiometric quantity.

In general, the process according to the invention leads to a heterogeneous mixture, although the constituents may also be mixed in a normal stirred vessel or even in kneaders, of the type typically used for example in the rubber field. The polycarbonate or the polyester carbonate or the polyester may be worked up, for example after separation of the liquid phase, by dissolution of these polycondensates in readily removable solvents, by subsequent washing in the usual way and by isolation in the usual way.

However, the polycondensates may also be worked up after separation of the organic and inorganic phases or direct washing of the reaction products present in swollen form with acids, such as for example phosphoric acid or hydrochloric acid, and water, which is preferably carried out in a kneader. The products thus washed are then dried. Moreover, the organic phase may be removed by a water steam destillation. The thermoplastic aromatic polycarbonates obtainable by the process according to the invention may have average weight average molecular weights of from 8,000 to 50,000 (as measured by gel permeation chromatography).

The technical applications for the thermoplastic polycarbonates obtainable by the process according to the invention are known. For example, they may be used in the electrical field and in the automotive field.

The thermoplastic aromatic polyester carbonates obtainable by the process according to the invention may have average weight average molecular weights of from 8,000 to 50,000 (as measured by gel permeation chromatography).

They may be stabilized, pigmented, filled, dyed, flameproofed or modified with other polymers in the usual way.

The technical applications for the thermoplastic polyester carbonates obtainable by the process according to the invention are known. For example, they may be used in the electrical field and in the automotive field.

The thermoplastic aromatic polyesters obtainable by the process according to the invention may have average weight average molecular weights of from 8,000 to 50,000 (as measured by gel permeation chromatography).

They may be stabilized, pigmented, filled, dyed, flameproofed or modified with other polymers in the usual way.

The technical applications for the thermoplastic polyesters obtainable by the process according to the invention are known. For example, they may be used in the electrical field and in the automotive field.

EXAMPLES 350 mol toluene, 100 ml i-octane and 20.5 g (0.102 mol) of a 1:1 mixture of terephthalic and isophthalic acid dichloride (dissolved in 150 ml toluene) are introduced together with 131 mg (0.5 mol-%) triphenylphosphine into a three-necked flask equipped with a stirrer, nitrogen inlet and dropping funnel. A solution of 22.8 g bisphenol A; 10 g (0.25 mol) sodium hydroxide, 600 mg (4 mol-%) p-tert.-butylphenol and 200 ml H$_2$O is then added dropwise over a period of 15 minutes at 10° C., followed by post-condensation for 60 minutes. The polymer accumulating is separated off from the alkaline phase, washed with dilute phosphoric acid and then repeatedly with water and dried in vacuo for 10 h at 80° C. Yield: 25.7 g, $\eta_{rel}$:1.346.

EXAMPLE 2

As Example 1 except that 175 ml toluene and 50 ml i-octane are used and the mixture is stirred for 2 h. Yield: 26.6 g $\eta_{rel}$:1.434

EXAMPLE 3

As Example 2, except that 2 mol-% triphenylphosphine are used as catalyst and no chain terminator (p-tert.-butylphenol) is used. Yield: 33.5 g, $\eta_{rel}$:1.653.

EXAMPLE 4

22.8 g (0.1 mol) bisphenol A are initially introduced at 20° C. with 400 ml water, 20 g (0.5 mol) sodium hydroxide, 125 ml toluene, 125 ml i-octane and 0.5 mol-% triphenylphosphine (131 mg) and 0.15 mol (14.85 g) phosgene introduced with stirring. The mixture is then stirred for 1 h at 20° C.

For working up, the mixture is diluted with water and acidifed with dilute phosphoric acid. The polymer is filtered off under suction, washed until neutral and dried in vacuo at 80° C. Yield: 22.7 g, $\eta_{rel}$:1.497.

EXAMPLE 5

As Example 4, except that 75 ml toluene and 75 ml i-octane are used and the reaction is carried out at 10° C. Yield: 25.1 g, $\eta_{rel}$:1.358.

We claim:

1. A process for the production of a resin selected from the group consisting of aromatic polycarbonates, aromatic polyester carbonates and aromatic polyester, by the known two-phase interfacial method in the presence of aqueous and organic phases by reaction of diphenols with at least one member selected from the group consisting of phosgene and aromatic dicarboxylic acid dihalides in the presence of catalysts, and at least one member selected from the group consisting of monofunctional chain terminators, branching agents having a functionality of three or more and reducing agents, wherein the organic phase comprises a mixture of from 5 to 95% by weight of aromatic hydrocarbons with from 95 to 5% by weight of at least one member selected from the group consisting of alkanes and cycloalkanes and in the presence of at least one catalyst selected from the group consisting of phosphine and phosphine oxide.

2. A process as claimed in claim 1 wherein the organic phases comprise a mixture of 30 to 90% by weight of aromatic hydrocarbons and 70 to 10% by weight of at least one member selected from the group consisting of alkanes and cycloalkanes.

3. A process as claimed in claim 1 wherein the organic phases comprise a mixture of 50 to 85% by weight of aromatic hydrocarbons and 50 to 15% by weight of at least one member selected from the group consisting of alkanes and cycloalkanes.

* * * * *